Patented Nov. 30, 1937

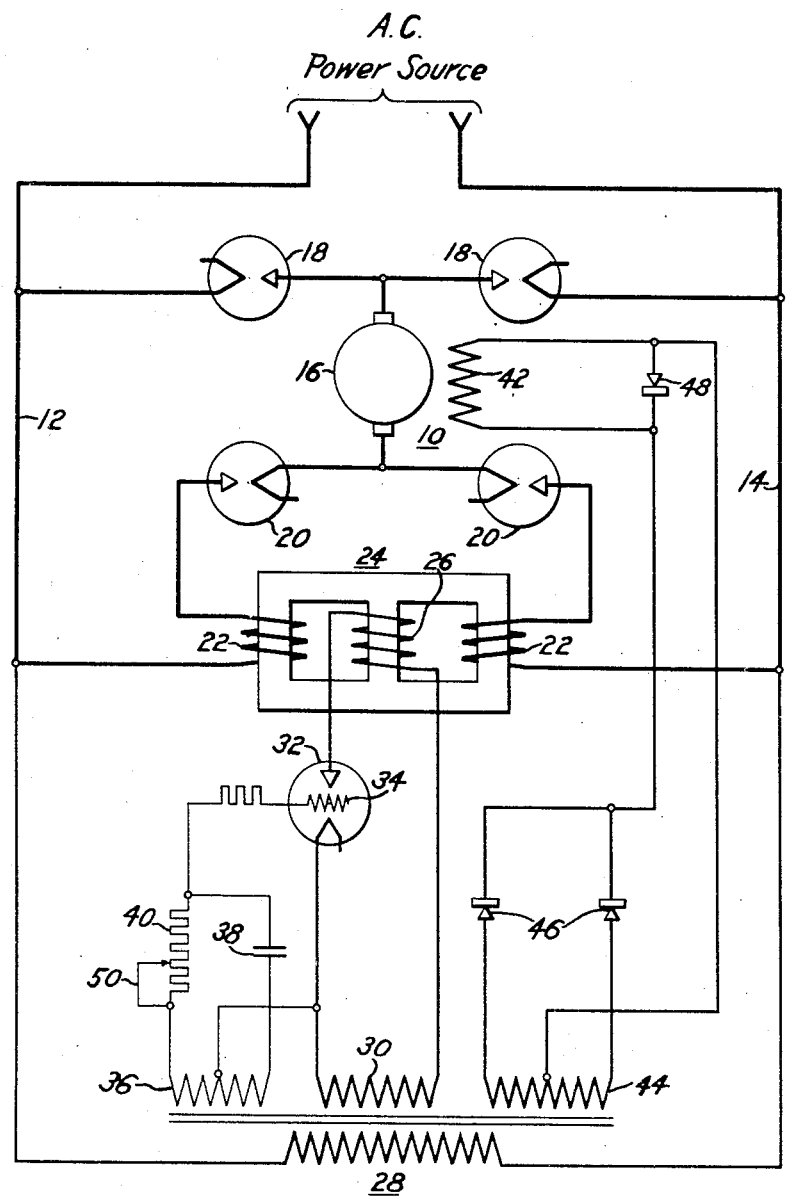

2,100,715

UNITED STATES PATENT OFFICE

2,100,715

ENERGIZING SYSTEM

Harold C. Jenks, Wilkinsburg, Pa., assignor to Westinghouse Electric & Manufacturing Company, East Pittsburgh, Pa., a corporation of Pennsylvania Application June 17, 1936, Serial No. 85,636

6 Claims. (Cl. 172—179)

My invention relates to energizing systems and it has particular relation to systems adapted to supply a motor or other electrical translating device with unidirectional energizing current derived through rectifying means from an alternating-current source of power.

One object of my invention is to reduce the cost of the equipment required for this purpose.

Another object is to provide a system which does not detract excessively from the inherent speed regulation characteristics of the motor.

A further object is to eliminate the need for the expensive double-motor-voltage transformer required in the main current-supply circuit of prior art systems.

An additional object is to reduce the number of controllable electronic-tube rectifiers required to adjust the motor energizing current.

In practicing my invention, I achieve the above objects by utilizing relatively inexpensive non-controllable rectifying devices in the motor armature supply circuit and also including in this circuit a current adjusting device in the form of a saturable-core reactance device. I then obtain motor speed control by varying the core saturating current which preferably I supply from the main power circuit through a connection including a grid-controlled rectifier tube and apparatus for appropriately varying the character of a control potential impressed thereon.

Not only is this equipment much less expensive than that required by the prior art systems, but the speed regulation of the motor is improved because the counter-electromotive force of the armature does not alter the breakdown or conductivity characteristics of the non-controllable supply rectifiers.

My invention itself, together with additional objects and advantages, will best be understood through the following description of a specific embodiment thereof when taken in conjunction with the accompanying drawing, in which:

The single figure is a diagrammatic representation of one preferred form of my improved system.

In the drawing, the motor to be energized is represented generally at 10, and the source of alternating-current power by conductors 12 and 14. The armature winding 16 of the motor is interconnected with these conductors through two pairs of rectifying devices 18 and 20 arranged in the manner shown to provide full-wave rectification. Each device may be in the form of the two-element electronic tube represented or other equivalent non-controllable device which is relatively inexpensive, and which has the necessary current-carrying capacity.

For the purpose of adjusting the magnitude of current supplied through these rectifiers, I utilize a saturable-core reactor 24 having alternating-current windings 22 included in series circuit relation with one of the pairs of rectifiers represented. As shown, this reactor is of a well-known three-legged construction, wherein the effective impedance of the windings 22 varies inversely with the unidirectional flux produced by a centrally carried saturating winding 26.

For the purpose of supplying energizing current to this winding from the power circuit 12—14, I preferably utilize a transformer 28 having a secondary winding 30 directly connected with the reactor winding 26 through a controllable rectifier tube 32. This tube is of a well-known gas-filled grid-controlled type capable of altering its conductivity characteristics in accordance with changes in the character of potential impressed upon its grid element 34.

Preferably, I supply this potential also from transformer 28 through a second section of secondary winding 36. This section is interconnected with the grid and cathode elements of the tube through a phase-shifting combination represented as comprising a capacitor 38 and an adjustable resistor 40.

When the displacement between the grid and anode voltage waves impressed upon tube 32 is small, conduction is instituted at an early point in each positive half cycle of anode voltage and the current passed by the tube is maximum. As the displacement is increased, the conduction starting point is progressively delayed and the current supplied through the tube to winding 26 correspondingly diminished.

The illustrated motor 10 is also provided with a shunt field winding 42 which may be supplied with unidirectional energizing current in any convenient manner such as from transformer 28 through a third section 44 of secondary winding and a pair of non-controllable rectifiers 46 illustrated as being of a well-known and inexpensive copper oxide disc type. In some cases it may also be desirable to utilize an auxiliary or bypass rectifier 48 shunting the field winding in the manner shown.

The operation of my complete motor energizing system will be more or less apparent from the foregoing description. In the connection shown, the motor excitation is maintained substantially constant. The armature of the motor is supplied with a full-wave rectified current through the rectifiers 18 and 20. The magnitude of this current and hence speed of the motor is dependent upon the effective impedance offered by windings 22 of the reactance device 24.

This in turn is determined by the adjustment along resistor 40 of a tap connection 50. When at the intermediate position illustrated, tube 32 supplies to winding 26 a corresponding intermediate value of saturating current which sets the impedance of windings 22 at some intermediate value.

Adjustment of tap 50 in one direction raises the tube conductivity, thereby to decrease the impedance of windings 22. The resulting increase in current supplied to the motor armature winding 16 produces a corresponding rise in motor speed. Similarly, an adjustment of tap 50 in the opposite direction lowers the reactor saturating current, and thereby produces a decrease in the motor speed.

While I have shown and described my improved system as being applied to a single-phase supply circuit, it will be apparent that it is equally applicable to polyphase circuits, the only changes required being a modification of the arrangement of the main current supply rectifiers.

Although I have shown and described a certain specific embodiment of my invention, I am fully aware that many modifications thereof are possible. My invention, therefore, is not to be restricted except insofar as is necessitated by the prior art and by the scope of the appended claims.

I claim as my invention:

1. A system for supplying the armature winding of a direct-current motor with unidirectional current comprising an alternating-current power circuit, full-wave rectifying means comprising two pairs of rectifying devices connected between the respective terminals of said motor winding and said alternating-current circuit, a reactance device comprising a core carrying alternating-current windings, adapted to be included in circuit with one pair of rectifying devices only, and a saturating winding, means for supplying to said saturating winding a unidirectional energizing current, and means for adjusting the magnitude of said current whereby to vary the motor speed.

2. A system for supplying the armature winding of a direct-current motor with unidirectional current comprising an alternating-current power circuit, full-wave rectifying means connected between said winding and said circuit, a reactance device comprising a core carrying two alternating-current windings and a saturating winding, said two alternating-current windings being connected on opposite sides of that portion of the rectifying means connected to one terminal of the direct-current motor armature winding, a circuit, including a grid-controlled electronic tube, for supplying energizing current to said saturating winding, means for impressing a control potential upon the grid of said tube, and means for altering the character of said potential whereby to adjust the current carried by said tube.

3. In a system comprising an alternating-current power circuit, a direct-current load device, means for supplying a unidirectional current from said power circuit to said device comprising two pairs of rectifying devices connected across said alternating-current power circuit to effect full-wave rectification, a saturable core reactor having two alternating-current windings connected in series circuit relation with and on opposite sides of one pair of rectifying devices and a saturating winding for controlling said reactor.

4. In a system comprising an alternating-current power circuit, a direct-current load device, means for supplying a unidirectional current from said power circuit to said device comprising two pairs of rectifying devices connected across said alternating-current power circuit to effect full-wave rectification, a saturable core reactor having two alternating-current windings connected in series circuit relation with and on opposite sides of one pair of rectifying devices and a saturating winding, and means for controlling the current supplied to said motor comprising a circuit including a grid controlled electronic tube for supplying current to said saturating winding, means for impressing a control potential upon the grid of said tube, and means for altering the current carried by said tube.

5. A system for supplying unidirectional current to a load device comprising an alternating-current power circuit having a pair of conductors, full-wave rectifying means comprising a pair of rectifying devices connected between said conductors and having an intermediate point connected to one terminal of said load device and a pair of rectifying devices connected between said conductors and having an intermediate point connected to another terminal of said load device, means for controlling said load device including a reactor comprising a core having a saturating winding and a plurality of alternating-current windings connected on opposite sides of one pair of rectifying devices only between said devices and the alternating-current conductors, and means for controlling said saturating winding.

6. A system for supplying unidirectional current to a load device comprising an alternating-current power circuit, full-wave rectifying means comprising two circuits from said power circuit through said load device each including a pair of rectifiers arranged on opposite sides of said load device for effecting one half wave rectification and an alternating-current winding, means for controlling said load device including a reactor having a core provided with said alternating-current windings and a saturating winding, and means for controlling said saturating winding.

HAROLD C. JENKS.